(12) United States Patent
Huang et al.

(10) Patent No.: US 11,734,190 B2
(45) Date of Patent: Aug. 22, 2023

(54) GENERATING CODEWORDS WITH DIVERSE PHYSICAL ADDRESSES FOR 3DXP MEMORY DEVICES

(71) Applicant: Micron Technology, Inc., Boise, ID (US)

(72) Inventors: Jian Huang, Union City, CA (US); Zhenming Zhou, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/319,497

(22) Filed: May 13, 2021

(65) Prior Publication Data

US 2022/0365883 A1 Nov. 17, 2022

(51) Int. Cl.
| | |
|---|---|
| *G06F 11/30* | (2006.01) |
| *G06F 12/1009* | (2016.01) |
| *G06F 11/10* | (2006.01) |
| *G06F 12/04* | (2006.01) |

(52) U.S. Cl.
CPC ...... *G06F 12/1009* (2013.01); *G06F 11/1068* (2013.01); *G06F 12/04* (2013.01); *G06F 2212/657* (2013.01)

(58) Field of Classification Search
None
See application file for complete search history.

(56) References Cited

U.S. PATENT DOCUMENTS

| | | | | |
|---|---|---|---|---|
| 6,636,641 B1* | 10/2003 | Kimura | ............... | H04N 19/182 |
| | | | | 382/246 |
| 10,048,865 B2* | 8/2018 | Mehra | ................... | G06F 3/0676 |
| 2004/0225946 A1* | 11/2004 | Hashimoto | ......... | G06F 11/1008 |
| 2009/0257331 A1* | 10/2009 | Hsueh | ............... | H03M 13/2954 |
| | | | | 369/47.32 |
| 2014/0245098 A1* | 8/2014 | Sharon | ............. | H03M 13/2942 |
| | | | | 714/755 |
| 2016/0162353 A1* | 6/2016 | Manohar | ............... | H03M 13/27 |
| | | | | 714/760 |
| 2020/0110767 A1* | 4/2020 | Alakuijala | .......... | H03M 7/3088 |
| 2021/0297094 A1* | 9/2021 | Hamelin | ............... | H04L 1/0041 |

* cited by examiner

*Primary Examiner* — Mujtaba M Chaudry
(74) *Attorney, Agent, or Firm* — Lowenstein Sandler LLP

(57) ABSTRACT

Disclosed is a system that comprises a memory device and a processing device, operatively coupled with the memory device, to perform operations that include, selecting, by the processing device, a first partition located on a first die of the memory device. The operations performed by the processing device further include selecting, based on a predefined partition offset reflecting a physical layout of the memory device, a second partition located on a second die of the memory device. The operations performed by the processing device further include generating a codeword comprising first data residing on the first partition and second data residing on the second partition.

20 Claims, 10 Drawing Sheets

| PA15 | PA14 | PA13 | PA12 |
|------|------|------|------|
| PA11 | PA10 | PA9  | PA8  |
| PA7  | PA6  | PA5  | PA4  |
| PA3  | PA2  | PA1  | PA0  |
| Periphery Circuit 210 ||||

FIG. 2

| CODEWORD 300 | | | | | |
|---|---|---|---|---|---|
| PAGE (16B) | PAGE (16B) | PAGE (16B) | PAGE (16B) | PAGE (16B) | PAGE (16B) |
| Die 0 | Die 1 | Die 2 | Die 3 | Die 4 | Die 5 |
| PA 0 | PA 0 | PA 0 | PA 0 | PA 0 | PA 0 |

FIG. 3

| CODEWORD 400 | | | | | |
|---|---|---|---|---|---|
| PAGE (16B) | PAGE (16B) | PAGE (16B) | PAGE (16B) | PAGE (16B) | PAGE (16B) |
| Die 0 | Die 1 | Die 2 | Die 3 | Die 4 | Die 5 |
| PA 0 | PA 1 | PA 2 | PA 3 | PA 4 | PA 5 |

FIG. 4

| CODEWORD 500 | | | | | |
|---|---|---|---|---|---|
| PAGE (16B) | PAGE (16B) | PAGE (16B) | PAGE (16B) | PAGE (16B) | PAGE (16B) |
| Die 0 | Die 1 | Die 2 | Die 3 | Die 4 | Die 5 |
| PA 0 | PA 3 | PA 6 | PA 7 | PA 11 | PA 12 |

FIG. 5

| Logical Block Partition Address | Table 0 | Table 1 | Table 2 | Table 3 | Table 4 |
|---|---|---|---|---|---|
| 0 | 0 | 1 | 2 | 3 | 4 |
| 1 | 1 | 2 | 3 | 4 | 5 |
| 2 | 2 | 3 | 4 | 5 | 6 |
| 3 | 3 | 4 | 5 | 6 | 7 |
| 4 | 4 | 5 | 6 | 7 | 8 |
| 5 | 5 | 6 | 7 | 8 | 9 |
| 6 | 6 | 7 | 8 | 9 | 10 |
| 7 | 7 | 8 | 9 | 10 | 11 |
| 8 | 8 | 9 | 10 | 11 | 12 |
| 9 | 9 | 10 | 11 | 12 | 13 |
| ... | ... | ... | ... | ... | ... |
| 12 | 12 | 13 | 14 | 15 | 0 |
| 13 | 13 | 14 | 15 | 0 | 1 |
| 14 | 14 | 15 | 0 | 1 | 2 |
| 15 | 15 | 0 | 1 | 2 | 3 |

FIG. 6

| CODEWORD 700 | | | | | |
|---|---|---|---|---|---|
| PAGE (16B) | PAGE (16B) | PAGE (16B) | PAGE (16B) | PAGE (16B) | PAGE (16B) |
| Die 0 | Die 1 | Die 2 | Die 3 | Die 4 | Die 5 |
| PA 0 (Table 0) | PA 1 (Table 1) | PA 2 (Table 2) | PA 3 (Table 3) | PA 4 (Table 4) | PA 5 (Table 5) |

GENERATING CODEWORDS WITH DIVERSE PHYSICAL ADDRESSES FOR 3DXP MEMORY DEVICES

TECHNICAL FIELD

Embodiments of the disclosure relate generally to memory sub-systems, and more specifically, relate to generating codewords with diverse physical addresses for 3DXP memory devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 2 is a diagram of a physical layout of partitions in a die of a memory device.

FIG. 3 is a diagram of an example codeword of a memory device.

FIG. 4 is a diagram of another example codeword of a memory device.

FIG. 5 is a diagram of another example codeword of a memory device.

FIG. 6 is a diagram of a mapping table of partition addresses associated with a die of a memory device in accordance with some embodiments of the present disclosure.

FIG. 7 is a diagram of another example codeword of a memory device.

DETAILED DESCRIPTION

Figure 1:
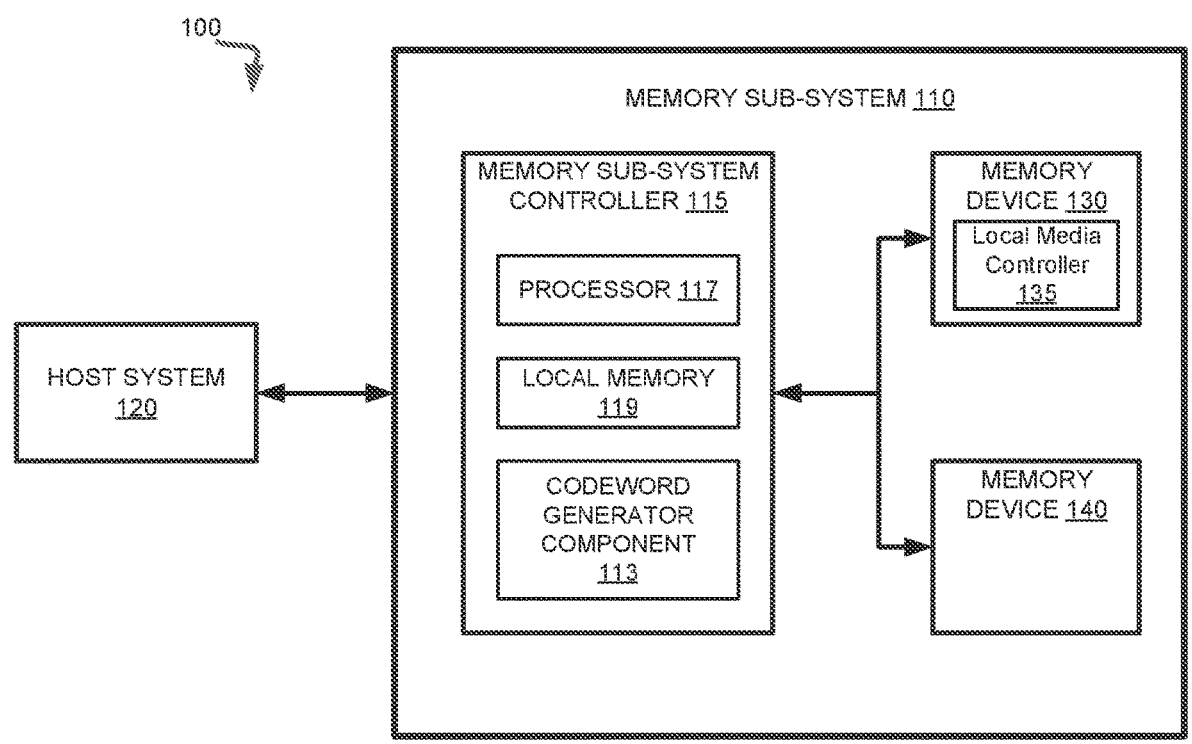
FIG. 1 illustrates an example computing system that includes a memory sub-system in accordance with some embodiments of the present disclosure.

Aspects of the present disclosure are directed to generating codewords with diverse physical addresses for 3DXP memory devices. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is three-dimensional cross-point ("3D cross-point" or "3DXP") memory devices that are a cross-point array of non-volatile memory that can perform bit storage based on a change of bulk resistance, in conjunction with a stackable cross-gridded data access array. Another example of non-volatile memory devices is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., 3DXP devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

Partitioning can refer to a process where memory is divided up into sections (e.g., partitions) for use by one or more applications, processes, operations, etc. A memory sub-system can be segmented into two or more partitions. A partition can be individually addressable and can contain information related to a specific application, process, operation, etc. A partition can be a logical separation of a memory sub-system that appears to the host system as multiple physical memory sub-systems.

Data operations can be performed by the memory sub-system. The data operations can be host-initiated operations. For example, the host system can initiate a data operation (e.g., write, read, erase, etc.) on a memory sub-system. The host system can access requests (e.g., write command, read command) to the memory sub-system, such as to store data on a memory device at the memory sub-system and to read data from the memory device on the memory sub-system. The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., ECC codeword, parity code), data version (e.g., used to distinguish age of data written), valid bitmap (which LBAs or logical transfer units contain valid data), etc.

A memory cell can be programmed (written to) by applying a certain voltage to the memory cell, which results in an electric charge being held by the memory cell. Certain voltages can be applied to memory cells through a power bus connected to a periphery circuit of the memory device. Given the physical layout of the memory device, partitions are located at different distances from the periphery circuit. Due to this layout constraint, there can be a power drop or delay in reaching certain partitions of the memory device, which can result in voltage differences among the partitions. Voltage differences among the partitions can result in differences in the raw bit error rates (RBER) of each partition. For example, one partition can have a high RBER whereas another partition can have a low RBER.

The memory sub-system may encode data into a format for storage at the memory device(s). For example, a class of error detection and correcting codes (ECC) may be used to encode the data. Encoded data written to physical memory cells of a memory device can be referred to as a codeword. The codeword may include one or more of user data, error correcting code, metadata, or other information. The memory sub-system may consist of one or more codewords.

Codewords may consist of data from one or more partitions. In some memory sub-systems, codewords may consist of data from partitions residing in different dice of a memory device. In selecting partitions from different dice, a memory sub-system may select one partition from each die, where each partition resides at the same physical location in its respective die. For example, a memory sub-system may choose a partition residing at physical address 0 from die 1, a partition residing at physical address 0 from die 2, and a partition residing at physical address 0 from die 3 in order to generate a codeword. Since each selected partition resides at the same physical address in its respective die, the RBER associated with each of these partitions will be the same or similar. Another codeword consisting of data from partitions located at a different physical area of the memory device may be associated with a low RBER if each of the partitions are associated with a low RBER. Since each codeword can therefore highly vary in RBER, this can result in performance issues, such as memory uncorrectable error correction code (UECC) errors. However, there is no current solution to address this problem.

Aspects of the present disclosure address the above and other deficiencies by having a memory sub-system that generates codewords with partitions from different physical locations in different dice of a memory device, thus generating codewords with more physical address diversity coverage and reducing RBER variation among codewords. For example, codewords may be generated with data from partitions located at different physical locations of each die of the memory device, thus covering partitions associated with different RBER. Since the partitions are from different physical locations of the memory device and thus are associated with different RBER, codewords will no longer be associated with highly varying levels of RBER, such as a high RBER or low RBER. Instead, the RBER level variation may be reduced among codewords.

Advantages of the present disclosure include, but are not limited to, significantly reducing the codeword to codeword RBER level variation. This can reduce the possibility of UECC errors with only a small change in hardware design. Therefore, there may be an increase in performance due to the reduced RBER level variation among codewords.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a codeword generator component 113 that can generate codewords using partitions located at different physical addresses in independent dice of a memory device. In some embodiments, the memory sub-system controller 115 includes at least a portion of the codeword generator component 113. In some embodiments, the codeword generator component 113 is part of the host system 110, an application, or an operating system. In other embodiments, local media controller 135 includes at least a portion of the codeword generator component 113 and is configured to perform the functionality described herein.

In one example, the codeword generator component 113 can generate a codeword using partitions from different physical locations in independent dice of a memory device. For example, the codeword generator component 113 may identify each die to be used in generating a codeword. The codeword generator component 113 may further identify the physical addresses of each partition located on each die of the memory device. The codeword generator component 113 may then add an offset to each partition's physical address. The codeword generator component 113 may generate a codeword by selecting partitions based on the offset added to each partition's physical address. In another example, the codeword generator component 113 may generate a codeword using a partition mapping table. For example, the codeword generator component 113 may identify the logical block address and physical address of each partition in a die. The codeword generator component 113 may map the logical address of each partition to a corresponding physical address of each partition in an entry of a mapping table. There may be separate mapping tables for each die. The codeword generator component 113 may then generate a codeword by selecting partitions from each die using the mapping tables. For example, the codeword generator component 113 may select partitions by looking up the physical addresses of each partition stored in each entry of the mapping tables. The codeword generator component 113 may select partitions of different locations in a die based on the physical addresses. By generating codewords with data from partitions of different physical locations across independent dice, the codeword generator component 113 may reduce the codeword level RBER variation in a memory device, resulting in an improvement in the performance of the memory device. Further details with regards to the operations of the codeword generator component 113 are described below.

FIG. 2 is a diagram of a physical layout of partitions in a die of a memory device. A power bus 205 may deliver power from a periphery circuit 210 to different partitions (e.g., PA0, PA5, PA30, etc.) in the die. As illustrated, some partitions (e.g., PA0, PA1, PA2, PA3) are closer in distance to the periphery circuit 210 than other partitions in the die (e.g., PA12, PA13, PA14, PA15). This is due to the physical layout and design of the memory device. Given this difference in distance, when a power bus delivers power to the different partitions of the memory device, there may be a drop in power in the partitions that are farther away from the periphery circuit 210. Due to this power drop, there may be a high RBER in partitions closer to the periphery circuit 210 and a low RBER in partitions farther away from the periphery circuit 210. For example, PA0 is closer in distance to a periphery circuit 210 than PA15. Due to this difference in distance, PA15 may likely experience a drop in power while PA0 may not. This power drop issue to partitions located farther away from periphery circuits exists in each die of a memory device. Thus, generating codewords using partitions of the same physical location in independent dice may result in codewords with large variations of RBER among the codewords. As discussed above, this can result in reduced performance due to an increase in UECC errors.

FIG. 3 is a diagram of an example codeword of a memory device. As discussed above, conventional memory sub-systems may generate codewords by selecting partitions across independent dice with the same physical addresses in each respective die. For example, as depicted in FIG. 3, a conventional memory sub-system may generate a codeword 300 consisting of partitions across 6 independent dice of a memory device, e.g., die 0, die 1, die 2, die 3, die 4, and die 5. The conventional memory sub-system may select partitions from each die. In order to determine which partitions to select from each die to use in generating the codeword 300, the conventional memory sub-system may select partitions with the same physical address in each die. For example, partition 0 of die 0 is located at physical address 0. Partition 0 of die 1 is located at physical address 0. Partition 0 of die 2 is located at physical address 0, etc. Since each partition is located at the same physical location in each die, the partitions may have the same or similar RBER due to the power drop issue discussed herein above. As such, this can result in an increase in UECC errors as discussed above.

FIG. 4 is a diagram of another example codeword of a memory device. In contrast to FIG. 3, a codeword 400 illustrated in FIG. 4 is not generated using partitions from the same physical locations of independent dice of a memory device. Instead, a memory sub-system (e.g., the codeword generator component 113 of FIG. 1) may generate the codeword 400 by selecting partitions of differing physical locations across independent dice. In one example, the codeword generator component 113 may generate the codeword 400 based on a predefined partition offset added to each partition's address of each die. The predefined partition offset may be set to a fixed value by the memory sub-system. The predefined partition offset may be an adjustable value. For example, the predefined partition offset may be a value of one added to each consecutive die in a memory device, e.g., die 0 has a value of 0 added to each partition's address, die 1 has a value of 1 added to each partition's address, die 2 has a value of 2 added to each partition's address, die 3 has a value of 3 added to each partition's address, etc. Since the partitions are from differing locations across each die, the partitions may not all be associated with the same or similar RBER. Instead, as depicted in FIG. 2, since the partitions may all be at different distances from the periphery circuit 210, the RBER may be varied among the partitions selected to generate the codeword 400, thus reducing the effect of the power drop issue discussed herein above. Further details with regards to the operations of the codeword generator component 113 are described below.

FIG. 5 is a diagram of an example codeword of a memory device. In contrast to FIG. 3, a codeword 500 illustrated in FIG. 5 is not generated using partitions from the same physical locations of independent dice of a memory device. Instead, a memory sub-system (e.g., the codeword generator component 113 of FIG. 1) may generate the codeword 500 by selecting partitions of differing physical locations across independent dice. In one example, instead of generating the codeword 500 using a predefined partition offset set to a fixed value (e.g., a value of one) as illustrated in FIG. 4, the codeword generator component 113 may generate the codeword 500 based on a different predefined partition offset for each die of the memory device. The predefined partition offset may be set to a different value for each die. For example, the codeword generator component 113 may assign a different predefined partition offset value to be added to the partition addresses of each consecutive die, such as 0 for die 0, 3 for die 1, 3 for die 2, 1 for die 3, etc. Thus, when generating the codeword 500, the codeword generator component 113 may select partition 0 from die 0 (adding an offset value of 0 to die 0), partition 3 from die 1 (adding an offset value of 3 to die 1), partition 6 from die 2 (adding an offset value of 3 to die 2), partition 7 from die 3 (adding a offset value of 1 to die 3), etc. Since the partitions are from differing locations across each die, the partitions may not all be associated with the same or similar RBER. Instead, as depicted in FIG. 2, since the partitions may all be at different distances from the periphery circuit 210, the RBER may be varied among the partitions selected to generate the codeword 400, thus reducing the effect of the power drop issue discussed herein above. Further details with regards to the operations of the codeword generator component 113 are described below.

FIG. 6 is a diagram of a mapping table of partition addresses associated with a die of a memory device in accordance with some embodiments of the present disclosure. In one example, a memory sub-system (e.g., the codeword generator component 113 of FIG. 1) may generate codewords based on a partition mapping table for each die of a memory device. For example, the codeword generator component 113 may identify the logical block addresses of each partition of each die in the memory device. The codeword generator component 113 may map the logical block address of each partition to a physical address of each partition in a mapping table associated with each die. There may be a separate mapping table for each die. In another example, the codeword generator component 113 may map the logical block address of each partition to a physical address of each partition in a mapping table associated with each die using bit mapping.

FIG. 7 is a diagram of an example codeword of a memory device. In contrast to FIG. 3, a codeword 700 illustrated in FIG. 7 is not generated using partitions from the same physical locations of independent dice of a memory device. Instead, a memory sub-system (e.g., the codeword generator component 113 of FIG. 1) may generate the codeword 500 by selecting partitions of differing physical locations across independent dice. In one example, instead of generating the codeword 700 using a predefined partition offset (e.g., a value of one) as illustrated in FIG. 4, the codeword generator component 113 may generate the codeword 700 based on partition mapping tables for each die of the memory device. For example, the codeword generator component 113 may select partitions based on the physical addresses of the partitions mapped in the mapping table associated with each die, as illustrated in FIG. 6.

Figure 8:
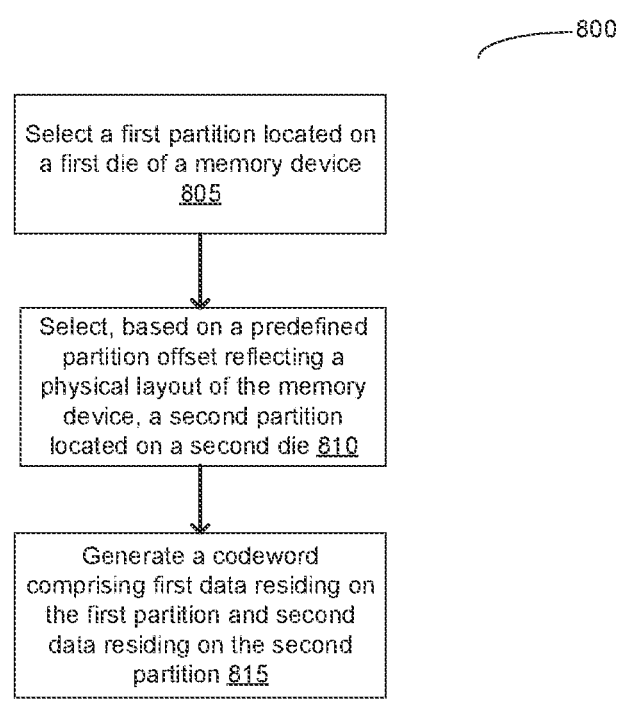
FIG. 8 is a flow diagram of an example method 800 to generate codewords for a memory device in accordance with some embodiments of the present disclosure.

FIG. 8 is a flow diagram of an example method 800 to generate codewords for a memory device, in accordance with some embodiments of the present disclosure. The method 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800 is performed by the codeword generator component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 805, the processing logic selects a first partition. The first partition may be located on a first die of a memory device. In certain implementations, the processing logic may identify the first partition, wherein identifying the first partition may be in response to a request, by the memory sub-system (e.g., the memory sub-system controller 115 of FIG. 1), to generate a codeword. In certain implementations, the memory device may be a 3DXP memory device. In certain implementations, the processing logic may select the first partition based on a predefined partition offset. The predefined partition offset may reflect a physical layout of the memory device. For example, the predefined partition offset may be a fixed value assigned to the first die of the memory device. In certain implementations, the processing logic may assign a fixed value (i.e., a predefined partition offset) to each die of the memory device. The fixed value may be a value of one added to each consecutive die of the memory device. For example, the fixed value assigned to the first die of the memory device may be zero. The fixed value assigned to a second die of the memory device may be one. The fixed value assigned to a third die of the memory device may be two, etc. In certain implementations, the predefined partition offset may be added to the physical address of each partition in the first die. In certain implementations, the predefined partition offset may be a changeable value assigned to the first die of the memory device. In certain implementations, the processing logic may select the first partition based on a partition mapping table associated with the first die. In one example, the partition mapping table associated with the first die may be created by mapping the logical block address of each partition in the first die to the physical address of each partition in the first die in an entry of a data structure, such as a table. In certain implementations, the partition mapping table associated with the first die may be created by bit mapping the logical block address of each partition in the first die to the physical address of each partition in the first die in an entry of a data structure, such as a table. The processing logic may identify the entry corresponding to the first partition in the partition mapping table. Based on evaluating the physical address of the first partition stored in the partition mapping table, the processing logic may select the first partition. Evaluating the physical address of the first partition stored in the partition mapping table may comprise determining that the physical address of the first partition is a unique physical address among a plurality of partitions selected for generating the codeword. The memory sub-system may store the partition mapping table on the memory device (e.g., the memory devices 130 or 140 of FIG. 1).

At operation 810, the processing logic selects a second partition located on a second die. The process logic may select the second partition located on the second die based on a predefined partition offset reflecting a physical layout of the memory device. For example, the predefined partition offset may be a fixed value assigned to the second die of the memory device. The fixed value may be a value of one added to each consecutive die of the memory device. For example, the fixed value assigned to the first die of the memory device may be zero. The fixed value assigned to the second die of the memory device may be one. The fixed value assigned to a third die of the memory device may be two, etc. In certain implementations, the predefined partition offset may be added to the physical address of each partition in the second die. In certain implementations, the predefined partition offset may be a changeable value assigned to the second die of the memory device. In certain implementations, the processing logic may select the second partition based on a partition mapping table associated with the second die. In one example, the partition mapping table associated with the second die may be created by mapping the logical block address of each partition in the second die to the physical address of each partition in the second die in an entry of a data structure, such as a table. In certain implementations, the partition mapping table associated with the second die may be created by bit mapping the logical block address of each partition in the second die to the physical address of each partition in the second die in an entry of a data structure, such as a table. The processing logic may identify the entry corresponding to the second partition in the partition mapping table. Based on evaluating the physical address of the second partition stored in the partition mapping table, the processing logic may select the second partition. Evaluating the physical address of the second partition stored in the partition mapping table may comprise determining that the physical address of the second partition is a unique physical address among a plurality of partitions selected for generating the codeword. The memory sub-system may store the partition mapping table on the memory device (e.g., the memory devices 130 or 140 of FIG. 1).

At operation 815, the processing logic generates a codeword comprising first data residing on the first partition and second data residing on the second partition. In an illustrative example, generating the codeword comprises identifying the first data residing on the first partition and the second data residing on the second partition. In certain implementations, generating the codeword may include data residing on a certain number of partitions (e.g., six partitions) residing on a certain number of dice (e.g., six dice) of the memory device. Data from each partition may reside on a single page of the codeword.

Figure 9:
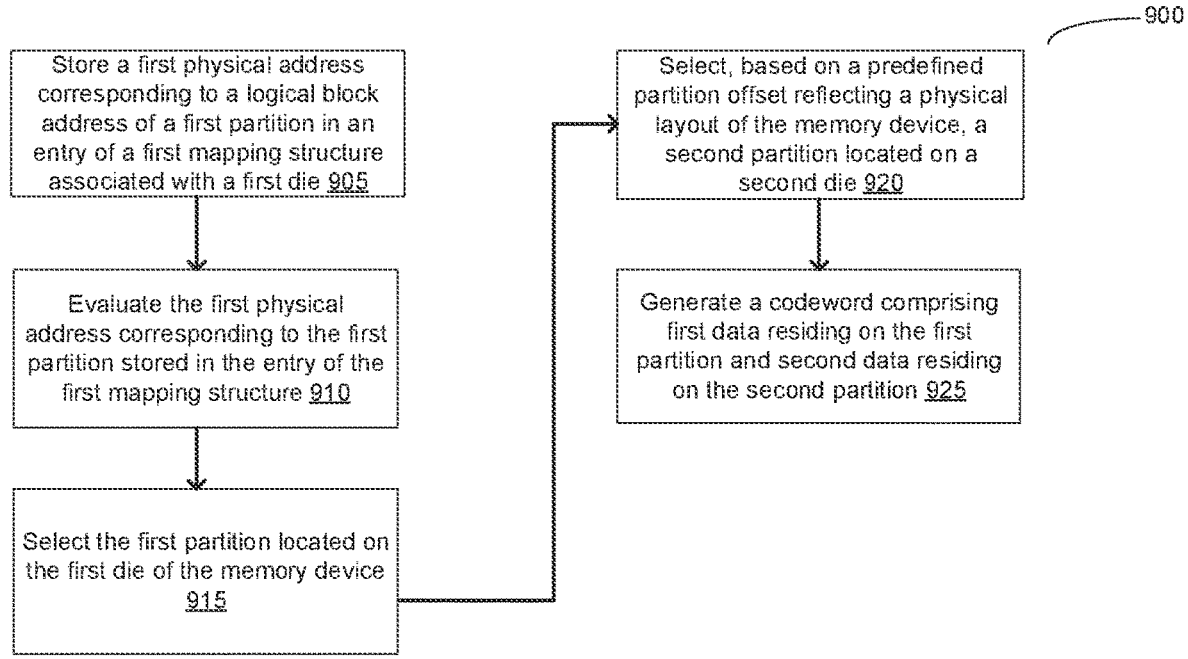
FIG. 9 is a flow diagram of an example method 900 to generate codewords for a memory device in accordance with some embodiments of the present disclosure.

FIG. 9 is a flow diagram of an example method 900 to generate codewords for a memory device in accordance with some embodiments of the present disclosure. The method 900 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 900 is performed by the codeword generator component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 905, the processing logic stores a first physical address corresponding to a logical block address of a first partition in an entry of a first mapping structure. The first partition may be located on a first die of a memory device. The first mapping structure may be associated with the first die. In certain implementations, the processing logic may identify the first partition, wherein identifying the first partition may be in response to a request, by the memory sub-system (e.g., the memory sub-system controller 115 of FIG. 1), to generate a codeword. In certain implementations, the memory device may be a 3DXP memory device. In one example, the first mapping structure may be a partition mapping table associated with the first die. The partition mapping table may be created by mapping the logical block address of each partition in the first die to the physical address of each partition in the first die in an entry of a data structure, such as a table. In certain implementations, the partition mapping table associated with the first die may be created by bit mapping the logical block address of each partition in the first die to the physical address of each partition in the first die in an entry of a data structure, such as a table. The memory sub-system may store the partition mapping table on the memory device (e.g., the memory devices 130 or 140 of FIG. 1).

At operation 910, the processing logic evaluates the first physical address corresponding to the first partition in the entry of the first mapping structure associated with the first die. The processing logic may identify the entry corresponding to the first partition in the partition mapping table. Evaluating the physical address of the first partition stored in the partition mapping table may comprise determining that the physical address of the first partition is a unique physical address among a plurality of partitions selected for generating the codeword.

At operation 915, the processing logic selects the first partition located on the first die. In certain implementations, the processing logic may select the first partition in response to evaluating the first physical address corresponding to the first partition stored in the entry of the first mapping structure associated with the first die. In certain implementations, the processing logic may select the first partition based on a predefined partition offset. The predefined partition offset may reflect a physical layout of the memory device. For example, the predefined partition offset may be a fixed value assigned to the first die of the memory device. In certain implementations, the processing logic may assign a fixed value (i.e., a predefined partition offset) to each die of the memory device. The fixed value may be a value of one added to each consecutive die of the memory device. For example, the fixed value assigned to the first die of the memory device may be zero. The fixed value assigned to a second die of the memory device may be one. The fixed value assigned to a third die of the memory device may be two, etc. In certain implementations, the predefined partition offset may be added to the physical address of each partition in the first die. In certain implementations, the predefined partition offset may be a changeable value assigned to the first die of the memory device.

At operation 920, the processing logic selects a second partition located on the second die. The process logic may select the second partition located on the second die based on a predefined partition offset reflecting a physical layout of the memory device. For example, the predefined partition offset may be a fixed value assigned to the second die of the memory device. The fixed value may be a value of one added to each consecutive die of the memory device. For example, the fixed value assigned to the first die of the memory device may be zero. The fixed value assigned to the second die of the memory device may be one. The fixed value assigned to a third die of the memory device may be two, etc. In certain implementations, the predefined partition offset may be added to the physical address of each partition in the second die. In certain implementations, the predefined partition offset may be a changeable value assigned to the second die of the memory device. In certain implementations, the processing logic may select the second partition based on a partition mapping table associated with the second die. The processing logic may store a second physical address corresponding to a logical block address of the second partition in an entry of a second mapping structure. The second mapping structure may be associated with the second die. In one example, the second mapping structure may be a partition mapping table associated with the second die. The partition mapping table may be created by mapping the logical block address of each partition in the second die to the physical address of each partition in the second die in an entry of a data structure, such as a table. In certain implementations, the partition mapping table associated with the second die may be created by bit mapping the logical block address of each partition in the second die to the physical address of each partition in the second die in an entry of a data structure, such as a table. The memory sub-system may store the partition mapping table on the memory device (e.g., the memory devices 130 or 140 of FIG. 1).

At operation 925, the processing logic generates a codeword comprising first data residing on the first partition and second data residing on the second partition. In an illustrative example, generating the codeword comprises identifying the first data residing on the first partition and the second data residing on the second partition. In certain implementations, generating the codeword may include data residing on a certain number of partitions (e.g., six partitions) residing on a certain number of dice (e.g., six dice) of the memory device. Data from each partition may reside on a single page of the codeword.

Figure 10:
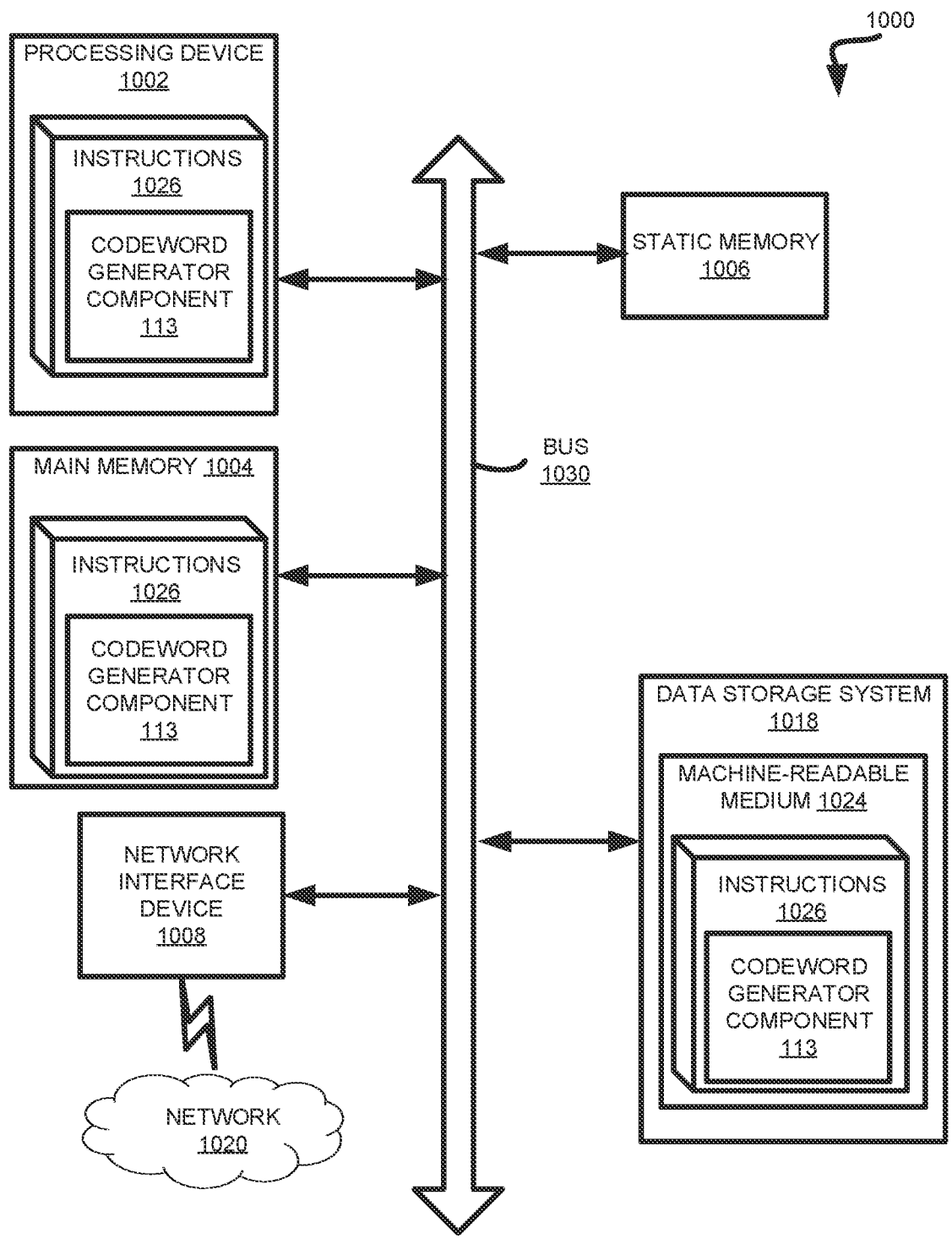
FIG. 10 is a block diagram of an example computer system in which embodiments of the present disclosure may operate.

FIG. 10 illustrates an example machine of a computer system 1000 within which a set of instructions, for causing the machine to perform any one or more of the methodologies discussed herein, can be executed. In some embodiments, the computer system 1000 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the codeword generator component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM) or RDRAM, etc.), a static memory 1006 (e.g., flash memory, static random access memory (SRAM), etc.), and a data storage system 1018, which communicate with each other via a bus 1030.

Processing device 1002 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 can also be one or more special-purpose processing devices such as an application specific integrated circuit (ASIC), a field programmable gate array (FPGA), a digital signal processor (DSP), network processor, or the like. The processing device 1002 is configured to execute instructions 1026 for performing the operations and steps discussed herein. The computer system 1000 can further include a network interface device 1008 to communicate over the network 1020.

The data storage system 1018 can include a machine-readable storage medium 1024 (also known as a computer-readable medium) on which is stored one or more sets of instructions 1026 or software embodying any one or more of the methodologies or functions described herein. The instructions 1026 can also reside, completely or at least partially, within the main memory 1004 and/or within the processing device 1002 during execution thereof by the computer system 1000, the main memory 1004 and the processing device 1002 also constituting machine-readable storage media. The machine-readable storage medium 1024, data storage system 1018, and/or main memory 1004 can correspond to the memory sub-system 110 of FIG. 1.

In one embodiment, the instructions 1026 include instructions to implement functionality corresponding to a codeword generator component (e.g., the codeword generator component 113 of FIG. 1). While the machine-readable storage medium 1024 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled with the memory device, to perform operations comprising:
   selecting a first partition located on a first die of the memory device;
   identifying a partition offset assigned to a second die of the memory device, wherein the partition offset reflects a physical layout of the memory device;
   identifying a second partition located on the second die;
   selecting, by adding the partition offset to a physical address of the second partition, a third partition located on the second die; and
   generating a codeword comprising first data residing on the first partition and second data residing on the third partition.

2. The system of claim 1, wherein the partition offset is a fixed value assigned to the second die of the memory device.

3. The system of claim 1, wherein selecting the first partition located on the first die of the memory device is based on the partition offset reflecting the physical layout of the memory device.

4. The system of claim 1, wherein the operations further comprise:
   storing a first physical address corresponding to a logical block address of the first partition in an entry of a first mapping structure associated with the first die; and
   storing a second physical address corresponding to a logical block address of the third partition in an entry of a second mapping structure associated with the second die.

5. The system of claim 4, wherein selecting the first partition located on the first die of the memory device is based on evaluating the first physical address corresponding to the first partition stored in the entry of the first mapping structure associated with the first die.

6. The system of claim 4, wherein selecting the third partition located on the second die of the memory device is further based on evaluating the second physical address corresponding to the third partition stored in the entry of the second mapping structure associated with the second die.

7. The system of claim 1, wherein the partition offset is a separate value assigned to each die of the memory device.

8. A method comprising:
   selecting, by a processing device, a first partition located on a first die of a memory device;
   identifying a partition offset assigned to a second die of the memory device, wherein the partition offset reflects a physical layout of the memory device;
   identifying a second partition located on the second die;
   selecting, by adding the partition offset to a physical address of the second partition, a third partition located on the second die; and
   generating a codeword comprising first data residing on the first partition and second data residing on the third partition.

9. The method of claim 8, wherein the partition offset is a fixed value assigned to the second die of the memory device.

10. The method of claim 8, wherein selecting the first partition located on the first die of the memory device is based on the partition offset reflecting the physical layout of the memory device.

11. The method of claim 8, further comprising:
    storing a first physical address corresponding to a logical block address of the first partition in an entry of a first mapping structure associated with the first die; and
    storing a second physical address corresponding to a logical block address of the third partition in an entry of a second mapping structure associated with the second die.

12. The method of claim 11, wherein selecting the first partition located on the first die of the memory device is based on evaluating the first physical address corresponding to the first partition stored in the entry of the first mapping structure associated with the first die.

13. The method of claim 11, wherein selecting the third partition located on the second die of the memory device is further based on evaluating the second physical address corresponding to the third partition stored in the entry of the second mapping structure associated with the second die.

14. The method of claim 8, wherein the partition offset is a separate value assigned to each die of the memory device.

15. A non-transitory computer readable medium comprising instructions, which when executed by a processing device, cause the processing device to perform operations comprising:
    storing a first physical address corresponding to a logical block address of a first partition in an entry of a first mapping structure associated with a first die of a memory device;
    evaluating the first physical address corresponding to the first partition stored in the entry of the first mapping structure associated with the first die;
    responsive to evaluating the first physical address corresponding to the first partition, selecting the first partition located on the first die of the memory device;
    identifying a partition offset assigned to a second die of the memory device, wherein the partition offset reflects a physical layout of the memory device;
    identifying a second partition located on the second die;

selecting, by adding the partition offset to a physical address of the second partition, a third partition located on the second die; and generating a codeword comprising first data residing on the first partition and second data residing on the third partition.

16. The non-transitory computer readable medium of claim 15, wherein the partition offset is a fixed value assigned to the second die of the memory device.

17. The non-transitory computer readable medium of claim 15, wherein selecting a fourth partition located on a third die of the memory device is based on the partition offset reflecting the physical layout of the memory device.

18. The non-transitory computer readable medium of claim 15, wherein the partition offset is a separate value assigned to each die of the memory device.

19. The non-transitory computer readable storage medium of claim 16, further comprising:

storing a second physical address corresponding to a logical block address of the third partition in an entry of a second mapping structure associated with the second die.

20. The non-transitory computer readable storage medium of claim 19, wherein selecting the third partition located on the second die of the memory device is further based on evaluating the second physical address corresponding to the third partition stored in the entry of the second mapping structure associated with the second die.

* * * * *